United States Patent [19]
Hillan

[11] Patent Number: 5,774,738
[45] Date of Patent: Jun. 30, 1998

[54] STATE MACHINES

[75] Inventor: John G. B. Hillan, San Diego, Calif.

[73] Assignee: Texas Instruments Incorporated, Dallas, Tex.

[21] Appl. No.: 912,498

[22] Filed: Aug. 18, 1997

Related U.S. Application Data

[63] Continuation of Ser. No. 56,978, May 3, 1993, abandoned.

[51] Int. Cl.⁶ .................................................... G06F 9/00
[52] U.S. Cl. .................................... 395/800.01; 395/670
[58] Field of Search ........................... 395/800.01, 800.1, 395/670, 672, 676, 827, 835, 839, 595, 856

[56] References Cited

U.S. PATENT DOCUMENTS

| | | | |
|---|---|---|---|
| 4,415,969 | 11/1983 | Bayliss et al. | 364/200 |
| 4,424,581 | 1/1984 | Kawai | 365/154 |
| 4,627,030 | 12/1986 | Barber | 365/189 |
| 4,750,591 | 6/1988 | Coste et al. | 187/130 |
| 4,772,845 | 9/1988 | Scott | 324/66 |
| 4,807,222 | 2/1989 | Amitay | 370/85 |
| 4,815,105 | 3/1989 | Bottoms et al. | 375/259 |
| 4,829,575 | 5/1989 | Lloyd | 381/41 |
| 4,873,456 | 10/1989 | Olisar et al. | 307/272.1 |
| 4,876,640 | 10/1989 | Shankar et al. | 364/200 |
| 4,879,680 | 11/1989 | Luckett et al. | 365/154 |
| 4,933,897 | 6/1990 | Shankar et al. | 364/900 |
| 4,965,472 | 10/1990 | Anderson | 307/465 |
| 5,005,183 | 4/1991 | Carey et al. | 375/1 |
| 5,067,104 | 11/1991 | Krishnakumar et al. | 395/375 |
| 5,204,555 | 4/1993 | Graham et al. | 307/465 |
| 5,283,817 | 2/1994 | Hara et al. | 379/61 |

FOREIGN PATENT DOCUMENTS

| | | |
|---|---|---|
| A 0 312 911 | 4/1989 | European Pat. Off. . |
| WO A 84/02988 | 8/1984 | WIPO . |
| WO A 87/00371 | 1/1987 | WIPO . |

OTHER PUBLICATIONS

"Digital Logic & Computer Design", Mano, 1979, pp. 202–251 (Chap 6), pp. 407–453 (Chap 10), pp. 459–495 (Chap. 11).

"Discrete Mathematics and Its Applications", Rosen, 1990 pp. 626–631 (Section 10.2), pp. 644–655.

"Intro to Switching Theory & Logic Design", Hall & Peterson, 1981 pp. 267–333.

Research Disclosure, No. 325, May 1991, abstract No. 32517 "Programmable Processor Bus to MMIO Bus Dirigible Bus Mapping Control" p. 293.

*Primary Examiner*—Alpesh M. Shah
*Attorney, Agent, or Firm*—Richard L. Donaldson; William B. Kempler

[57] ABSTRACT

State machines having a hierarchical arrangement of machines as between a parent state machine 10 and sibling state machines 11, 12, and 14. The parent state machine 10 generates a plurality of outputs constituting its output state as based upon its input state defined by inputs N and its internal state. Part of the input state is defined by a set of inputs 15 which include asynchronous signals such as reset and interrupts. The parent state machine 10 defines or partially defines input states as applied to the respective sibling state machines 11, 12, and 14 by producing a series of output states in response to input states as applied thereto and independent upon an existing internal state. This system enables machine design time to be reliably shortened by virtue of easier validation of tasks assigned to the sibling machines.

9 Claims, 2 Drawing Sheets

# STATE MACHINES

This application is a Continuation of application Ser. No. 08/056,978 filed May 3, 1993, now abandoned.

BACKGROUND OF THE INVENTION

The present invention relates to state machines, that is controllers producing a series of output states to control apparatus or perform a function in response to input states applied thereto and in dependance upon an existing internal state. Such a controller is particularly suited to operation as a sequencer, wherein different output state sequences are required in dependence upon input conditions. In coding algorithms, for example, such as might be employed in cordless telephony, samples of a waveform received or to be transmitted may be stored in memory. To enable the samples to be assembled for application, for example, to a digital to analogue convertor or a parallel to serial or serial to parallel convertor, a sequence of addresses must be applied to the memory. The addresses themselves being specified by the coding algorithm in use. The sequence varies according to not only the algorithm itself, but coding history and control and adaption parameters. A state machine can provide the means of generation of such an address sequence.

State machines may be realised in the form of combinational logic having machine output states as outputs and machine input states as inputs. Typically, state machines are essentially synchronous (clocked) devices, with the output states able to change only at each clock cycle, any particular output state being derived from the input state current at the previous clock cycle and the existing internal state.

Machine functionality may be defined by a listing of the connection between logic devices providing combinational logic and there are design aids in existence in which a connection pattern (Net list) may be generated by means of relatively high level language (the "Verilog" hardware description language supplied by Cadence Inc, for example), in which the required logical connections may be described by expressions.

The task of the designer of a state machine is to specify a unique output state for all possible input states and internal stored states such that the required output state sequence is generated to effect the desired control in response to actual inputs, that an appropriate address sequence is generated, for example.

Designing a state machine of relatively few states is relatively straight forward, however, complexity rapidly increases as the number of possible states increases (the number of inputs multiplied by the number of outputs would be a guide). A particular problem with complex state machines is that of making changes to the control regime, since an alteration in defining one output state can read across into the definition of others. Following such a change, the entire machine must be revalidated; any confidence built up by successful operation of the machine to date is lost. This is equally true of a change made in response to a known problem (debugging) and it is not uncommon to find the "fix" for one bug giving rise to another which may go undetected. Another concern with a complex machine is the potentially large number of unspecified input states which must be mapped to a benign output state. At switch on, for example, the initial state of the machine is random and an undefined input state is possible. Application of such a state must not result in unexpected or uncontrolled behaviour. Hardware solutions (forcing a known input state for example) are possible, but not preferred due to added expense. Part of the design task therefore is to provide a mapping for all possible input states. There is always concern, however, that a state has been missed or that mapping of a particular state has been negated through change. The fault so created is of course of the worst character; random in nature. The present invention has been made with such problems in view.

SUMMARY OF THE INVENTION

According to the present invention in a first aspect thereof, a state machine includes a hierarchical arrangement of machines wherein at least one parent machine defines or partially defines input states applied to a sibling machine.

According to the present invention in another aspect thereof, a state machine includes a parent machine and a sibling machine wherein the parent defines or partially defines input states applied to the sibling.

According to the present invention in yet another aspect thereof, there is provided a method of realising a state machine including the steps of identifying tasks which may be performed by a sibling machine in a hierarchical arrangement.

The present invention provides an advantage in that tasks performed by sibling machines may be self contained such that changes to a sibling cannot affect or compromise other sibling machine performance. There is also economy in realising the machine since tasks may be divided and individually verified in a way analogues to a "sub-routine" in the software arts. Design may therefore be speeded up since parallel task development is possible and a late or presently unspecified task does not become critical to continuing development of the remainder. The problem of input state mapping is also eased since individually the state machines are less complex. Again changes cannot read across.

BRIEF DESCRIPTION OF THE DRAWINGS

In order that features and advantages of the present invention may be further appreciated, embodiments will now be described with reference to the accompanying diagrammatic drawings of which.

DETAILED DESCRIPTION OF THE INVENTION

Figure 1:
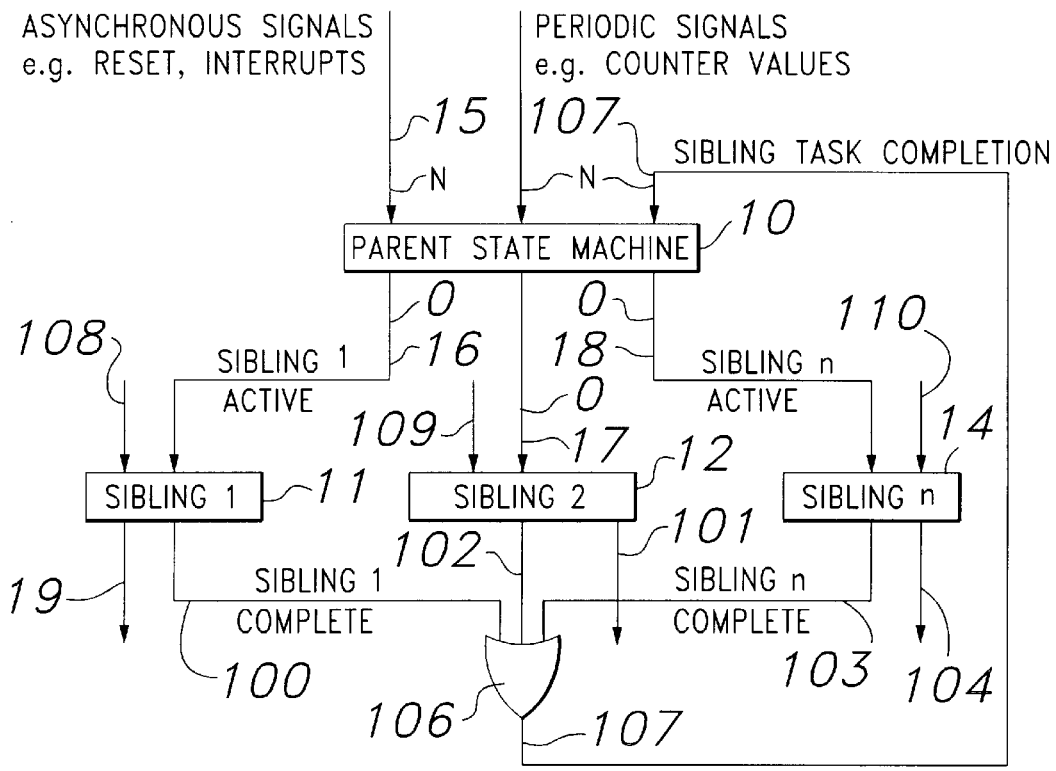
FIG. 1 represents a state machine in accordance with the present invention.

In a state machine, a hierarchical relationship exists between a parent state machine 10 and sibling state machines 11, 12 and 14. The parent state machine 10 generates a plurality of outputs [0] constituting its output state based upon its input state defined by inputs [N] and its internal state. Part of the input state is defined by a set of inputs 15 constituting asynchronous signals including reset and interrupts, such as a signal indicative of the loss of synchronisation in an address generator controller.

A invocation portion of the output state 16 constitutes part of the input state for the sibling processor 11, the remainder of the input state being tasks a specific input set 108. Similarly, output state portions 17 and 18 and task specific inputs 109, 110 constitute the input states for sibling processors 12 and 14 respectively. The output state of sibling processor 11 provides a set of outputs 19 which contributes to the overall output state of the state machine and an output 100 indicative that the task preformed by the sibling 11 is completed. The complete output state of the state machine is defined by this portion 19 together with portion 101 from sibling processor 12 and 104 from sibling processor 14. Sibling processors 12 and 14 provide outputs 102 and 103 indicative that their respective tasks have been completed. Outputs 100, 102 and 103 are logically ORed together by an OR gate 106 to provide an output 107 indicative that overall, a sibling task has been completed. This output 107 constitutes part of the input state an of the parent state machine 10.

In the example of an address generator for a cordless telephone in which transmission of a plurality of telephones is synchronised into time slots, three tasks suceptible to processing by siblings are exemplified. A clear task which clears the memory space, a header task which generates an address sequence to provide header information and a data task which generates the main address sequence for the voice data. Additionally, there are asynchronous events to be trapped, for example an alarm state is required which is a task to be performed should synchronisation be lost. Furthermore, an idle state may be defined which is to be entered if none of the other states are active, but nonetheless the state machine is awaiting a command, for example the arrival of a time slot allocated for transmission.

The parent state machine monitors activity and is designed to select which of the sibling tasks is to be performed, i.e. to implement the procedure described above. This procedure may be described in a high level language as follows:

```
If (reset_active) next_parent_state = PARENT_CLEAR:
else
If (sync_lost)next_parent_state = PARENT_ALARM;
else
case (current_parent_state)
    PARENT_CLEAR    : If (sibling_task_complete)
                        next_parent_state =
                        PARENT IDLE;
                      else next_parent_state =
                        PARENT CLEAR;
    PARENT_IDLE     : if (counter = HEADER_TRIGGER)
                        next_parent_state =
                        PARENT HEADER;
                      else next_parent_state =
                        PARENT IDLE;
    PARENT_HEADER   : if (sibling_task_complete)
                        next_parent_state =
                        PARENT_HEADER;
                      else next_parent_state =
                        PARENT_HEADER;
    PARENT_DATA     : if (sibling_task_complete)
                        next_parent_state =
                        PARENT IDLE;
                      else next_parent_state =
                        PARENT DATA;
    PARENT_ALARM    : if (sibling_task_complete)
                        next_parent_state =
                        PARENT IDLE;
                      else next_parent_state =
                        PARENT ALARM;
    endcase
```

Note that the parent is sensitive to asynchronous inputs such as the device reset and the sync lost alarm, regular events such as a counter reaching a trigger value indicative of a transmission time slot, and responses from sibling tasks.

When the overall device is to be reset, the parent goes into CLEAR mode. This activates the clear sibling state machine once the reset is removed. Then the parent waits in this mode until the task is removed. Then the parent waits in this mode until the task completes, when it switches into IDLE mode. In this condition, no tasks are active.

In the IDLE state, when the counter reaches the HEADER_TRIGGER value, the header task is woken.

Upon completion of the header task, the parent immediately invokes the data task and waits for that to end. After this has completed, the parent returns to IDLE.

Note that if at any stage the sync-lost signal becomes true, the parent will go immediately to the ALARM state, and invoke the alarm task. This will automatically switch off any other task which may be active. In this way, priorities for task ordering can easily be seen and changed if necessary, without the need to consider the details of the operation of each individual task.

For the purposes of this example, the CLEAR sibling task will be considered in more detail. The task may be expressed as follows:

```
if (reset_active OR clear_task_inactive) next_clear_state =
CLEAR_SLEEP;
else
case (current clear_state)
CLEAR_SLEEP : next_clear_state = CLEAR_INIT;
CLEAR_INIT : begin
        next_memory_input = 0;
        load_memory_input = TRUE;
        next_memory_address = 0;
        load_memory_address = TRUE;
        increment_memory_address = FALSE;
        next_loop_counter = MEMORY_ADDRESS_LIMIT;
        load_loop_counter = TRUE;
        increment_loop_counter = FALSE;
        next_clear_state = CLEAR_WRITE;
    end
CLEAR_WRITE : begin
        write_request = 1;
        if (NOT write acknowledge)
            nest_clear_state = CLEAR_WRITE:
        else
    begin
        if (loop_counter <> 0)
    begin
        load_memory_address = TRUE;
        increment_memory_address = TRUE;
        next_clear_state = CLEAR_WRITE;
    end else
    begin
        clear_task_complete = TRUE;
        next_clear_state = CLEAR_IDLE;
    end
    end
    end
    end
CLEAR_IDLE : next_clear_state = CLEAR_IDLE;
endcase
```

The above state machine represents a task which simply clears the entire memory address space. It is in SLEEP mode until the parent wakes it up using the clear_task_inactive signal, and all outputs default to being reset. Once activated, it goes into INIT state, and forces the ram address and data input to zero and the loop counter to the number of addresses to be cleared.

From there it passes to the write request state, where a request is made to the memory access controller to write the memory_input value to the memory-address. Once this has been done, a decision is made based upon the loop_counter value; if it is non-zero, more values are to be written, and a signal that the memory_address value is to be incremented is set. This uses the incrementer/adder/decrementer/subtractor in a common block to save space. The loop_counter is decremented in the same manner.

Once the loop_counter reaches zero, the state is set to IDLE, and the parent is signalled that the task has completed. Finally, the clear task waits in IDLE until the parent has changed state and reset the task active line once more.

It will be appreciated that this concept may be extended from this very simple example to a more complex sequence generator, and how different functions can be allocated to different sibling tasks, for instance loading of selectable sections of coefficient store into RAM, sorting date tables in RAM any many others. The parent state machine can then be thought of as calling subroutines in a given order and the design concept moves up from addresses to tasks, in a similar manner to a piece of software. For sufficiently generalised state machine tasks, a compiler could be used to speed the design task even more.

It will be further appreciated that a task which is a sibling task of a parent state machine may itself constitute a parent with respect to a further sibling task.

Figure 2:
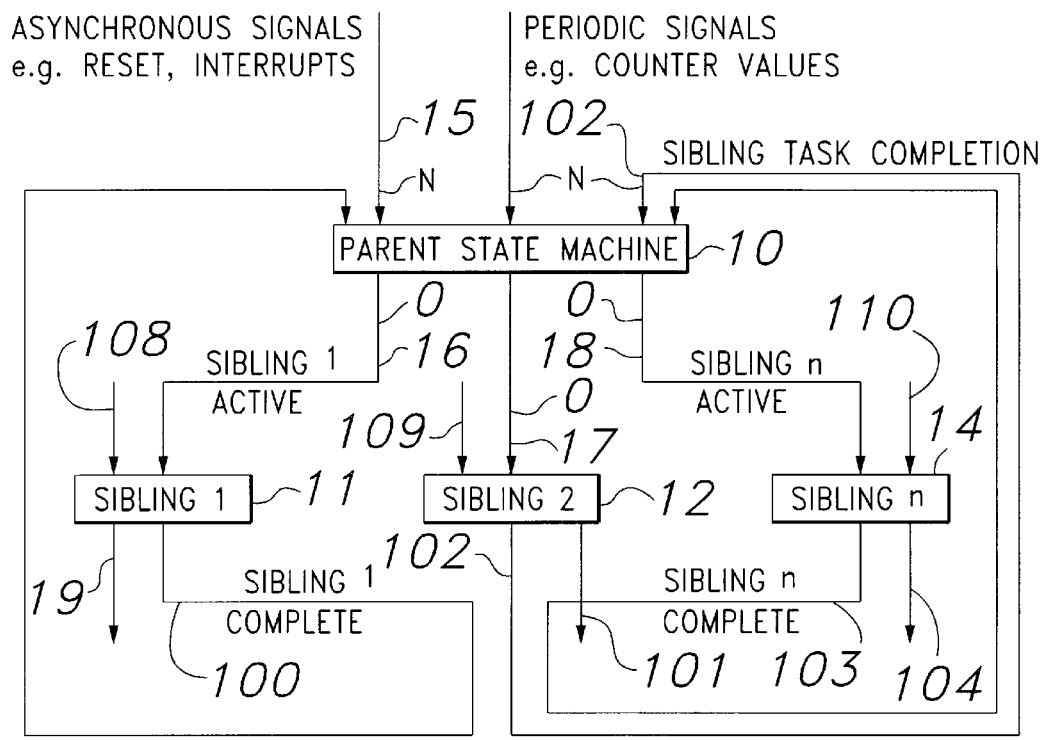
FIG. 2 represents an alternative embodiment.
Figure 3:
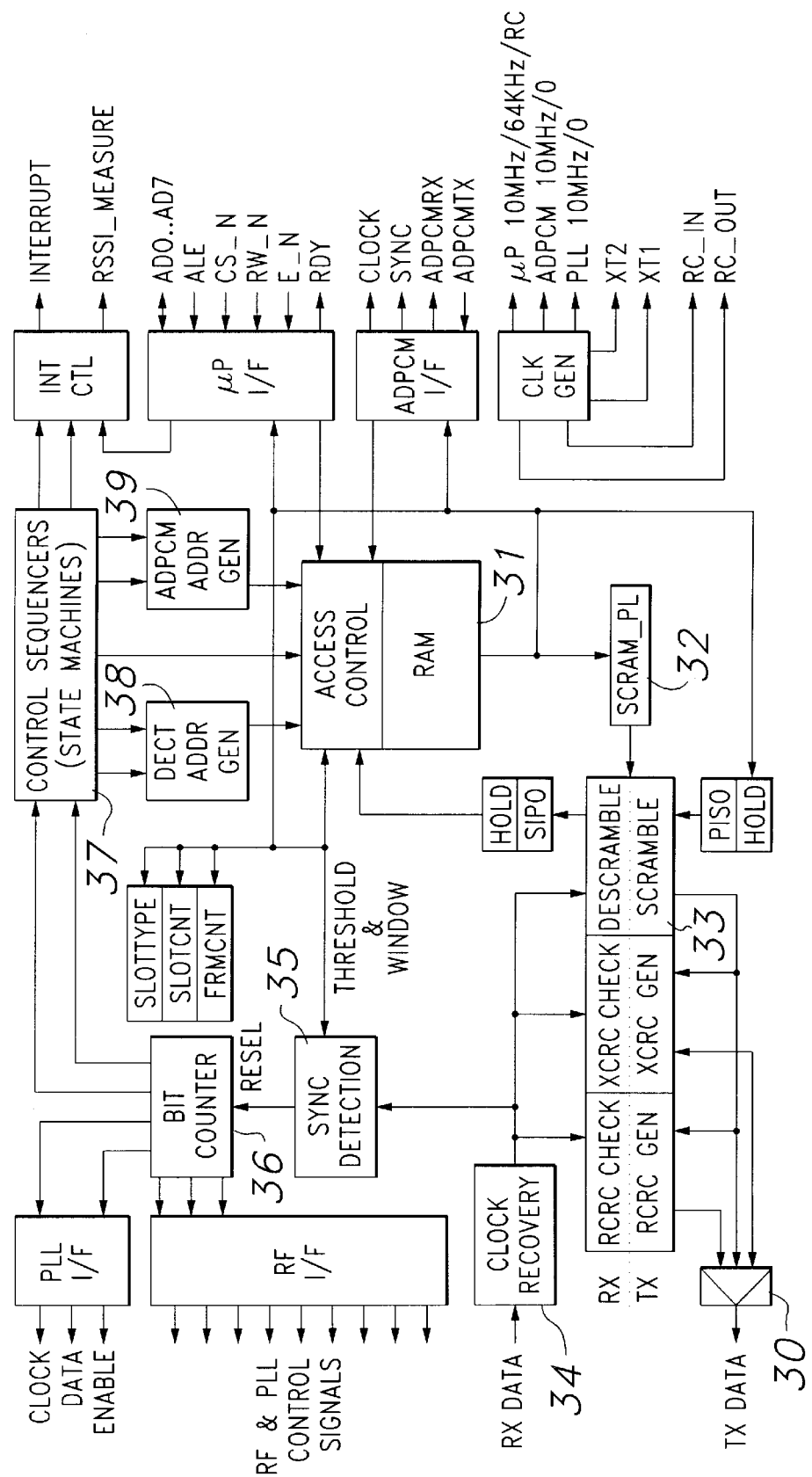
FIG. 3 shows a state machine controller for an address generator in a cordless telephone system.

In the embodiment described thus for the sibling tasks are essentially alternative tasks (i.e. they are invoked one at a time with the parent machine acting as a sequence and there is a single completion line 107 common to all tasks). The siblings may however be arranged to be invoked in parallel, and an embodiment of such a state machine is shown in FIG. 3. Where parts are the same or equivalent to those of FIG. 2, common reference numbers have been used. An example of a parent state machine arranged to invoke sibling tasks in parallel will now be given.

```
'define wake_up_read_source_A    3'b001
'define wake_up_read_source_B    3'b010
'define wake_up_read_source_C    3'b100
'define_kill_read_source_A       3'b110
'define_kill_read_source_B       3'b101
'define_kill_read_source_C       3'b011
if (reset_active)
   next_woken_up_list = 3'b000;
if (request_from_source_A)
   next_woken_up_list = woken_up_list | 'wake_up_read_source_A;
if (request_from_source_B)
   next_woken_up_list = woken_up_list | 'wake_up_read_source_B;
if (request_from_source_C)
   next_woken_up_list = woken_up_list | 'wake_up_read_source_C;
if (source_A_read_complete)
   next_woken_up_list = woken_up_list & 'kill_read_source_A;
if (source_B_read_complete)
   next_woken_up_list = woken_up_list & 'kill_read_source_B;
if (source C_read_complete)
   next_woken_up_list = woken_up_list & 'kill_read_source_C;
if (source_A_error Or source_B_error Or source_C_error)
   begin
   next_woken_up_list = 3'b000;
   source_error_warning : = 'SET;
end
```

In the above example, 3'b001 means the bit binary value "1001".

The current output state of the parent machine (the invocation lines of the siblings) is given by a 3-bit binary value defined as "next_woken_up_list". To invoke a task the present value is logically ORed with a 3-bit binary value dependent upon the task to be invoked, for example, to invoke task B the present value is ORed with the 3-bit binary value "010". Equally, to reset the task, the present value is logically ANDed with the masking value "101". In the example, both the invocation values and the termination values are defined as variables.

It will be noted that in this example, the number of tasks which may be activated at any one time is anything from zero (as in a reset period), to all 3 if required. It will also be noted that in this case, each sibling task which can be woken up in parallel has its own signal line (FIG. 2) to the parent state machine so that the parent can determine which task has completed. Note also that the number of communication channels between parent and sibling is not necessarily restricted just to start/stop. In the above example, an extra "error" condition is generated by each task, and the behaviour of the parent is modified by these reports, thus in this example sibling returns to the parent include information other than simply completion as was the case in the simpler example.

The sibling state machines may be designed to be autonomous if desired. However, if similar task portions exist in more than one sibling, resource storing is possible. For example, in the case of an address generator incrementing an address value is a common task portion. A single incrementer which serves to receive, increment and return an incremented value may be arranged to be shared between tasks. In the case of a parent which invokes one sibling at a time, no conflict in respect of the shared resource can arise. In a paralleled arrangement, a scheduler may be employed to ensure correct allocation of shared resources. Thus it will be realised that known state machine design and efficiency techniques, including interlocking wherein linked state machines signal each other, may be applied to the state machine and parent and sibling machines of the present invention.

The code fragments describing example state machines within the context of the examples have been written in the "Verilog" hardware description language. This is for illustration only, and the description could be in any other suitable hardware description language such as VHDL, or in the form of a Programmable Logic Array truth table, or ROM contents, etc.

In one design fabrication procedure, Verilog source code is used to simulate the behaviour of the state machine hierarchy, and then used with the Synopsys Design Compiler (TM) to generate an Application Specific Integrated Circuit netlist which can be layed out, fabricated and packaged by a silicon vendor.

It is envisaged that a state machine hierarchy in accordance with the present invention may be realised by means of a design tool which receives specifications of the parent and sibling tasks in a high level language in the format of a main routine and a plurality of sub routines. The design tool is arranged further to identify routines which themselves may constitute sibling tasks. A compiler may then be used to translate from the high level language to a suitable hardware description format. In the course of the use of such a design tool, many state machines to perform sibling tasks will be created. Some existing tasks may be made available to the user of the design tool as pre-existing sub routines in a library. In this way, inefficiency caused by the new to design state machines from scratch for every application are reduced.

Whatever the design methodology, however, a typical result is an assembly of interconnected logic gates and latches. The required connectivity may be applied to a standardised physical arrangement of logic devices as might be made available as part of a substantially preexisting integrated circuit layout. The character of the state machine may therefore be applied to an uncommitted device by establishing a device interconnection pattern defining the machine itself. This approach brings the benefits of volume integrated circuit technology to bear on application specific state machine fabrication. Particular advantage is possible if the complier approach it adapted best to exploit the resources of the pre-existing layout.

It will be appreciated that the present invention has thereby provided a means of designing and realising state machines that does not involve any classical hardware design. Since the design is now comprised of a plurality of relatively less complex state machines, the task of ensuring that the transition table is completely specified is eased.

Moreover, when changes are made, validation of the appropriate sibling only is required. A complete validation is unnecessary.

The state machines described thus far as embodiments of the invention may be used in a cordless telephone, a portion of the arrangement of which is shown in FIG. 3. In the arrangement, the purpose is to transmit data via a transmission channel 30. Data to be so transmitted is assembled into a random access memory 31 via the various peripherals shown. Data is then relayed to the transmission channel 30 via an encryption arrangement (32, 33).

Control of the data transmission is by means of a state machine 37, such as the embodiments of the invention which have been thus far described.

The system is synchronised to a clock 34 recovered from a reception channel such that data may be transmitted in a time slot allocated to the particular telephone. The start of the transmission time slot is detected by a counter 36 which provides an input to the state machine 37. The state machine is arranged to provide a sequence of addresses which are fed to the memory area 31 so that the data to be transmitted may be correctly assembled together with its coding, heading and control information. In the arrangement shown, the state machine 37 provides two alternative address sequences via address generators 38 and 39 depending upon whether stored data is being received or transmitted via the radio channel in accordance with the Digital European Cordless Telephone standard (address generator 38), or transferred to or from a coder as Adaptive Digital Pulse Code Modulation data (address generator 39).

From the foregoing, the following advantages at least of the present invention will be appreciated.

Machine design time can be shortened with greater confidence in integrity by virtue of easier validation of sibling tasks. Reliable modification of tasks and their invocation sequence and timing is facilitated hence interalia variant machines may be speedily realised. Alteration of sequence, which in prior art machine would involve, for example, the movement of a potential large portion of code from one place to another and a consequent re-validation, can be achieved by a much simpler and easily verifiable modification of the controlling parent machine. Hence, testability is improved not only for design verification, but also at device level since test vectors to test the entire arrangement may be more straightforwardally generated Incorporation of asynchronous (non clock linked) events is more straightforward since the effect of such an event on only the affected task needs to be considered.

What is claimed is:

1. A state machine system comprising:
    a hierarchical arrangement of a plurality of state machines;
    at least one parent state machine included in the plurality of state machines providing said hierarchical arrangement;
    at least one sibling state machine included in the plurality of state machines providing said hierarchical arrangement and located in a subordinate relation to said at least one parent state machine in the hierarchical arrangement;
    said at least one parent state machine having N inputs including at least one asynchronous input signal and an internal state cooperating to define an input state for said at least one parent state machine;
    said at least one parent state machine further having a plurality of outputs and generating a plurality of output signals thereto cooperating to define an output state in dependence upon the input state of said at least one parent state machine;
    said at least one sibling state machine having a task specific input set for receiving task specific inputs and a further input connected to one of the outputs of said parent state machine; and
    said at least one sibling state machine having an input state applied thereto at least partially defined by said one output of said at least one parent state machine in providing a portion of the output state of said at least one parent state machine as at least part of the input state of said at least one sibling state machine.

2. A state machine system as set forth in claim 1, wherein said at least one sibling state machine has a plurality of outputs for providing a set of output signals contributing to the overall output state of the state machine system and a further output signal indicative of the completion of a task as performed by said at least one sibling state machine in response to the application of task specific signals at said task specific input set of said at least one sibling state machine.

3. A state machine system as set forth in claim 2, further including a feedback loop extending from the one of said plurality of outputs of said at least one sibling state machine indicative that the task performed by said at least sibling state machine has been completed to an input of said at least one parent state machine.

4. A state machine system as set forth in claim 1, wherein a plurality of sibling state machines are included in the plurality of state machines providing said hierarchical arrangement with each of said plurality of sibling state machines being located in a subordinate relation to said at least: one parent state machine in the hierarchical arrangement;
    the plurality of sibling state machines corresponding in number to the plurality of outputs of said at least one parent state machine;
    each of said plurality of sibling state machines having a task specific input set for receiving task specific inputs and a further input connected to a corresponding one of the plurality of outputs of said at least one parent state machine; and
    each of said plurality of sibling state machines having a respective input state applied thereto at least partially defined by the output of said plurality of outputs of said at least parent state machine which corresponds thereto in providing respective portions of the output state of said at least one parent state machine as at least part of the respective input states of each of said plurality of sibling state machines.

5. A state machine system as set forth in claim 4, wherein each of said plurality of sibling state machines has a respective plurality of outputs for providing a set of output signals contributing to the overall output state of the state machine system and a respective further output signal indicative that the task performed by the respective one of said plurality of sibling state machines in response to the application of task specific signals to the input set therefor has been completed.

6. A state machine system as set forth in claim 5, wherein each of said plurality of sibling state machines is provided with a respective feedback loop from the one of said plurality of outputs therefor indicative of the completion of the task performed by the respective sibling state machine to a respective input of said at least one parent state machine.

7. A state machine system as set forth in claim 5, wherein each of said plurality of sibling state machines is provided with a respective feedback loop from the one of said plurality of outputs therefor indicative of the completion of the task performed by the respective sibling state machine; and logic gate means connected to each of the outputs from each of said plurality of sibling state machines indicative of the completion of the respective tasks as performed thereby and providing a single composite output connected to an input of said at least one parent state machine for defining part of the input state thereof.

8. A state machine as set forth in claim 7, wherein said logic gate means is an OR gate.

9. A method of validating the completion of specific tasks assigned in a state machine system, said method comprising:

arranging a hierarchy of a plurality of state machines including at least one parent state machine and a plurality of sibling state machines disposed in a subordinate relation to said at least one parent state machine in the hierarchical arrangement;

applying N inputs to said at least one parent state machine including the application of at least one asynchronous input signal to define in conjunction with an internal state of said at least one parent state machine an input state;

providing each of said plurality of sibling state machines with respective task specific inputs at a task specific input set;

at least partially defining the input state applied to each of said plurality of sibling state machines on the basis of a corresponding portion of the output state of said at least one parent state machine;

providing a task-completion signal from a respective one of said plurality of sibling state machines indicative that the task performed by the respective sibling state machine has been completed;

logically applying each of said task-completion signals from respective ones of said plurality of sibling state machines to an input of said at least one parent state machine as part of the input state thereof; and validating the tasks assigned to each of said plurality of sibling state machines by said at least one parent state machine in response to receiving a task-completion signal at the input thereof.

\* \* \* \* \*